United States Patent
Tang et al.

(10) Patent No.: US 9,313,538 B2
(45) Date of Patent: Apr. 12, 2016

(54) METHODS AND SYSTEMS FOR ESTABLISHING A MODE OF COMMUNICATION BETWEEN PARTICULAR USERS BASED ON PERCEIVED LULLS IN MEDIA ASSETS

(71) Applicant: Rovi Guides, Inc., Santa Clara, CA (US)

(72) Inventors: Young Tang, Burbank, CA (US); Robin Ford, Los Angeles, CA (US); Helen Zhang, Burbank, CA (US)

(73) Assignee: Rovi Guides, Inc., San Carlos, CA (US)

( * ) Notice: Subject to any disclaimer, the term of this patent is extended or adjusted under 35 U.S.C. 154(b) by 23 days.

(21) Appl. No.: 14/266,524

(22) Filed: Apr. 30, 2014

(65) Prior Publication Data

US 2015/0319471 A1 Nov. 5, 2015

(51) Int. Cl.
| H04N 5/445 | (2011.01) |
| H04N 21/2668 | (2011.01) |
| H04N 21/258 | (2011.01) |
| H04N 21/81 | (2011.01) |
| H04N 21/4788 | (2011.01) |
| H04N 21/442 | (2011.01) |
| H04N 21/466 | (2011.01) |

(52) U.S. Cl.
CPC ..... *H04N 21/2668* (2013.01); *H04N 21/25891* (2013.01); *H04N 21/44218* (2013.01); *H04N 21/4667* (2013.01); *H04N 21/4788* (2013.01); *H04N 21/812* (2013.01)

(58) Field of Classification Search
CPC ............... H04N 21/25891; H04N 21/44218; H04N 21/44213; H04N 21/44222; H04N 21/458; H04N 21/466; H04N 21/812
See application file for complete search history.

(56) References Cited

U.S. PATENT DOCUMENTS

| 6,239,794 | B1 | 5/2001 | Yuen et al. |
| 6,388,714 | B1 | 5/2002 | Schein et al. |
| 6,564,378 | B1 | 5/2003 | Satterfield et al. |
| 6,754,904 | B1 | 6/2004 | Cooper et al. |
| 6,756,997 | B1 | 6/2004 | Ward, III et al. |
| 7,165,098 | B1 | 1/2007 | Boyer et al. |
| 7,440,674 | B2 | 10/2008 | Plotnick et al. |
| 7,761,892 | B2 | 7/2010 | Ellis et al. |
| 8,046,801 | B2 | 10/2011 | Ellis et al. |
| 8,312,500 | B2 * | 11/2012 | Emerson ............... H04L 12/581 725/110 |
| 8,522,273 | B2 | 8/2013 | Huber et al. |
| 2002/0174430 | A1 | 11/2002 | Ellis et al. |
| 2003/0110499 | A1 | 6/2003 | Knudson et al. |
| 2003/0225833 | A1 * | 12/2003 | Pilat ..................... G06Q 10/107 709/204 |
| 2004/0010808 | A1 | 1/2004 | deCarmo |
| 2004/0015608 | A1 | 1/2004 | Ellis et al. |

(Continued)

FOREIGN PATENT DOCUMENTS

| WO | WO 00/33576 | 6/2000 |
| WO | WO 2010/006435 | 1/2010 |

*Primary Examiner* — John Schnurr

(74) *Attorney, Agent, or Firm* — Ropes & Gray LLP

(57) ABSTRACT

Methods and systems are also provided herein for establishing a mode of communication between a first user and a second user when a media asset is in a lull. Control circuitry may determine that a first user perceives a segment of the media asset as a lull based on a first user profile. The control circuitry may retrieve a second user profile associated with a second user, and may determine that the second user also perceives the segment of the media asset to be a lull based on the second user profile. The control circuitry may responsively establish a mode of communication (e.g., a chat window) between the first user and the second user.

20 Claims, 7 Drawing Sheets

(56) References Cited

U.S. PATENT DOCUMENTS

| | | |
|---|---|---|
| 2005/0251827 A1 | 11/2005 | Ellis et al. |
| 2008/0068507 A1 | 3/2008 | Krause et al. |
| 2009/0133069 A1 | 5/2009 | Conness et al. |
| 2009/0235297 A1 | 9/2009 | Ferrone |
| 2010/0083318 A1* | 4/2010 | Weare ............... G06F 17/30035 725/46 |
| 2010/0095317 A1* | 4/2010 | Toebes .................. H04N 7/163 725/9 |
| 2010/0153885 A1 | 6/2010 | Yates |
| 2010/0242074 A1* | 9/2010 | Rouse .................. H04L 12/588 725/100 |
| 2013/0312029 A1 | 11/2013 | Huber et al. |
| 2014/0026157 A1* | 1/2014 | Wang ............... H04N 21/25875 725/12 |
| 2014/0082670 A1 | 3/2014 | Papish |
| 2014/0280603 A1 | 9/2014 | Rideout et al. |
| 2015/0112796 A1* | 4/2015 | Greenzeiger ...... G06Q 30/0251 705/14.49 |

\* cited by examiner

METHODS AND SYSTEMS FOR ESTABLISHING A MODE OF COMMUNICATION BETWEEN PARTICULAR USERS BASED ON PERCEIVED LULLS IN MEDIA ASSETS

BACKGROUND OF THE INVENTION

Advertising is a highly profitable industry and has a myriad of applications in all types of media. Media content distributors and providers may be able to increase the profitability of their media content by finding new and creative ways to incorporate advertising into their media.

SUMMARY

Methods and systems are provided herein for presenting advertisements based on social media activity. For example, in an effort to better monetize media such as a live sporting event, a media content provider may monitor social media activity and base the timing or placement of an advertisement on the social media activity. As one example, a media content provider may determine that a person who typically watches particular media content is currently watching the particular media content, and is currently engaged in social media activity that is unrelated to the particular media content. The media content provider may determine that there is a lull in the media content and may place an advertisement in the media content at that time to take advantage of a period where the user will not be distracted from a show that is intently being watched.

In some embodiments, control circuitry identifies that a first user is viewing a media asset. For example, the control circuitry may identify that the first user is viewing a football game. The control circuitry may retrieve a user profile for the first user and determine whether the media asset matches characteristics of the user profile. As an example, the control circuitry may determine whether the user profile reflects that the first user typically watches football games. The control circuitry may detect that the first user has transmitted a communication to a remote server, which in turn transmits the communication to a plurality of other users associated with the first user on the remote server. For example, the communication may be a live blog post, a string of characters, a photograph, a video, any combination thereof, or any like transmission.

The control circuitry may then determine whether the content of the communication is related to the media asset. For example, the control circuitry may determine that the communication is related to a football game if the communication identifies a football team (e.g., via a hashtag), if the communication includes keywords or photographs indicative of a football-related item (e.g., player names or statistics, a score, etc.), and the like. In response to determining that the content of the communication is not related to the media asset and that the media asset matches characteristics of the user profile, the control circuitry may cause an advertisement to be presented to the user. For example, the control circuitry may determine that the user is transmitting communications that discuss a friend's birthday party, which may indicate that a lull has occurred in the football game and the user is bored. The control circuitry may responsively present an advertisement, e.g., as an overlay on top of at least a portion of a video feed of the football game, as the user is unlikely to find the advertisement intrusive since the user is not interested in the football game at the time.

In some embodiments, a user of the plurality of other users may have exchanged a message with the first user that identifies the first user. For example, the user of the plurality of other users may have exchanged a request with the first user to become a "friend" or "buddy" of the first user, such that messages of either the first user or the user of the plurality of other users are visible to each of the first user and the user of the plurality of other users.

In some embodiments, the content of the communication may be determined, by the control circuitry, to not be related to the media asset if the communication does not identify at least one of the identity of the media asset, a feature of the media asset, and a happenstance of the media asset. For example, the communication may be determined to not identify the identity of the media asset if it does not name a title or genre of the media asset (e.g., a team name of a team engaged in a football game). As another example, the communication may be determined to not identify a feature of the media asset if the communication does not identify something particular about the media asset (e.g., in the context of a football game, the term "touchdown" or "field goal"). As another example, the communication may be determined to not identify a happenstance of the media asset if the communication does not discuss a current activity of the media asset (e.g., in the context of a football game, the communication does not mention a touchdown, even though a touchdown was scored within the last three minutes).

In some embodiments, the media asset is generated for display by the control circuitry at a user equipment device of the first user, and the communication is received from the same user equipment device of the first user. For example, the user may be generating the communication via the user's television, and the user may be viewing the media asset (e.g., football game) on the user's television. The communication may be made while the media asset is displayed, e.g., by overlaying a social media communications application on top of the media asset.

In some embodiments, the control circuitry may identify a second user that is viewing the media asset, and may also cause the advertisement to be presented to the second user in response to determining that the content of the communication is not related to the media asset and that the media asset matches characteristics of the user profile. For example, the control circuitry may determine that, because the first user typically watches media assets like the presently playing media asset, and because the first user is generating communications that are unrelated to the media asset, there is a likelihood that an advertisement is likely to be unobtrusive to a second user's viewing experience of the media asset.

In some embodiments, in response to determining that the content of the communication is not related to the media asset and that the media asset matches characteristics of the user profile, the control circuitry may mark a segment of the media asset as corresponding to a lull in the media asset. For example, the first user may be bored while watching a football game because a timeout is called, and may begin making communications about something unrelated to the football game. The control circuitry may determine that a lull has occurred responsive to learning that the first user is making communications that are not related to the football game.

In some embodiments, the advertisement may be presented to the first user as an overlay on top of the media asset. For example, if the user is watching a football game, the advertisement may be placed on top of a video feed of the football game. The advertisement may be placed strategically on top of the video feed such that it does not obstruct viewing of, e.g., game play of the football game. In some embodiments, the advertisement may be semi-transparent such that activity occurring in, e.g., a video feed of a media asset may be visible behind the media asset.

In some embodiments, control circuitry may determine whether the first user has been viewing the media asset for a threshold amount of time, and may cause the advertisement to be presented to the first user in response to determining that (1) the content of the communication is not related to the media asset, (2) the media asset matches characteristics of the user profile, and (3) the first user has been viewing the media asset for the threshold amount of time. For example, the control circuitry may refrain from making determinations about whether to display an advertisement until the user has been watching, e.g., a football game, for at least 15 minutes. This may help avoid errant advertisements being displayed while a user is, e.g., rapidly switching between media assets (e.g., channel surfing) and has not settled on watching a particular media asset.

In some embodiments, the control circuitry may retrieve metadata of the media asset from a database, and may identify a product or service based on the retrieved metadata. The control circuitry may cause the advertisement to advertise the identified product or service. For example, the control circuitry may determine that the media asset is a football game, and may cause the advertisement to include an advertisement for football helmets.

Methods and systems are also provided herein for presenting an advertisement to a user who perceives a media asset to be in a lull, and refraining from presenting the advertisement to a different user who does not perceive the media asset to be in a lull. In some embodiments, control circuitry retrieves a first profile associated with a first user who is consuming a media asset. The control circuitry may determine that the first user perceives a segment of the media asset as a lull based on the first user profile. For example, the media asset may be a football game where the New York Giants and the New England Patriots face one another. The control circuitry may determine that the first user is a fan of the New England Patriots based on the user profile. The control circuitry may further determine that the New England Patriots are losing the game by an insurmountable amount of points, and therefore the first user likely perceives the present segment of the football game as a lull because the team that the first user is rooting for will almost certainly lose.

In some embodiments, the control circuitry may determine that the first user perceives a segment of the media asset as a lull, and responsively identify a second user who is also consuming the media asset. The control circuitry may retrieve a second user profile that is associated with the second user, and may determine whether or not the second user also perceives the segment of the media asset to be a lull based on the second user profile. Following from the example above, for example, if the second user is a fan of the New York Giants, and the Giants are winning a football game that is being played by a significant margin, the second user may be determined not to perceive the present segment of the media asset to be a lull because the second user is likely excited and invested in the football game. In response to determining that the second user does not also perceive the segment of the media asset to be a lull, the control circuitry may cause the advertisement to be presented to the first user but not to the second user.

In some embodiments, control circuitry may monitor activity of the first user performed while the first user is consuming the media asset, and determine that the first user perceives the segment of the media asset as a lull based on the activity. As described in the foregoing, the activity of the first user that is monitored may be communications of the first user. In some embodiments, the control circuitry may determine that the first user perceives the segment of the media asset as a lull when receiving a message including content that is exclusively unrelated to the media asset. In some embodiments, the remote server may make the message available to a plurality of other users associated with the first user.

In some embodiments, the advertisement that the control circuitry presents to the first user may be different from the advertisement presented to the second user. For example, if the media asset is a football game of the New York Giants versus the New England Patriots, the advertisement presented to the first user may be for a New York Giants player jersey, and the advertisement presented to the second user may be for a New England Patriots player jersey.

In some embodiments, the second user may be associated with the first user. For example, the second user may be a friend or buddy of the first user on a social networking platform.

In some embodiments, the control circuitry may, in response to determining that the second user also perceives the segment of the media asset to be a lull, present the advertisement to both the first user and the second user. For example, if the control circuitry determines that a football game is in a timeout and there is no present game-related activity, an advertisement may be presented to both users without respect to their fan affiliations.

In some embodiments, determining that the first user perceives a segment of the media asset as a lull based on the first user profile may include determining whether the content of the communication is related to the media asset. For example, the control circuitry may detect that the first user has transmitted a communication to a remote server, and may determine whether the communication is related to the media asset (e.g., a football game), e.g., by determining whether the communication identifies the media asset (e.g., identifies a football team. e.g., via a hashtag), if the communication includes keywords or photographs indicative of a football-related item (e.g., player names or statistics, a score, etc.), and the like. In response to determining that the content of the communication is not related to the media asset and that the media asset matches characteristics of the user profile, the control circuitry may determine that the first user perceives a segment of the media asset as a lull. For example, the control circuitry may determine that the user is transmitting communications that discuss a friend's birthday party, which may indicate that a lull has occurred in the football game and the user is bored. The control circuitry may responsively present an advertisement, e.g., as an overlay on top of at least a portion of a video feed of the football game, as the user is unlikely to find the advertisement intrusive since the user is not interested in the football game at the time.

Methods and systems are also provided herein for establishing a mode of communication between a first user and a second user when a media asset is in a lull. In some embodiments, control circuitry may retrieve a first user profile associated with a first user who is consuming a media asset. The control circuitry may determine that the first user perceives a segment of the media asset as a lull based on the first user profile. For example, the media asset may be a football game where the New York Giants and the New England Patriots face one another. The control circuitry may determine that the first user is a fan of the New England Patriots based on the user profile. The control circuitry may further determine that the New England Patriots are losing the game by an insurmountable amount of points, and therefore the first user likely perceives the present segment of the football game as a lull because the team that the first user is rooting for will almost certainly lose.

In some embodiments, the control circuitry may retrieve a second user profile associated with a second user, and may determine that the second user also perceives the segment of the media asset to be a lull based on the second user profile. For example, the second user may also be a fan of the New England Patriots, which will result in the control circuitry determining that the second user has also lost interested in the football game. The control circuitry may responsively establish a mode of communication (e.g., a chat window) between the first user and the second user.

In some embodiments, the mode of communication may be a chat window. In some embodiments, the mode of communication (e.g., chat window) may be accessible to, and viewable by, both the first user and the second user. A chat window may, for example, be generated for display as an overlay on top of a media asset (e.g., football game). In some embodiments, the mode of communication (e.g., chat window) may be generated for display on a user equipment device that is different to a device (e.g., tablet computer) that the media asset is currently being consumed from (e.g., television).

In some embodiments, the control circuitry may generate for display a selectable option for establishing the mode of communication on top of the media asset. For example, when a lull is perceived, a selectable option to launch a chat window may be selected for causing the chat window to be overlaid on top of the media asset. As another example, when a lull is perceived by the control circuitry, the control circuitry may establish the mode of communication on a specified user equipment device in response to a selection of a selectable option. For example, if a "send to phone" option is selected, a chat window may appear on a user's smartphone device. As another example, a selectable option for tearing own the mode of communication may be generated for display by the control circuitry (e.g., an "end chat session" button). As another example, the control circuitry may generate for display a selectable option to toggle a view of the mode of communication (e.g., when the option is selected, a chat window is toggled on or off an overlay of the media asset).

In some embodiments, control circuitry may transmit a selectable option to a first user to join a communication session. When the first user selects the selectable option, the control circuitry may cause a communications interface or social media interface to be enabled at a user equipment device of the first user (e.g., a chat window on the first user's tablet device). In some embodiments, the selectable option may be transmitted to the second user to join the communication session. In response to receiving a selection of the selectable option from the second user, the control circuitry may cause the communications interface or social media interface to also be enabled at a user equipment device of the second user. In this manner, the control circuitry may enable any users who wish to join a chat session to do so.

It should be noted, the systems and/or methods described above may be combined with, applied to, or used in accordance with, other systems, methods and/or apparatuses discussed both above and below.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION OF EMBODIMENTS

Figure 1:
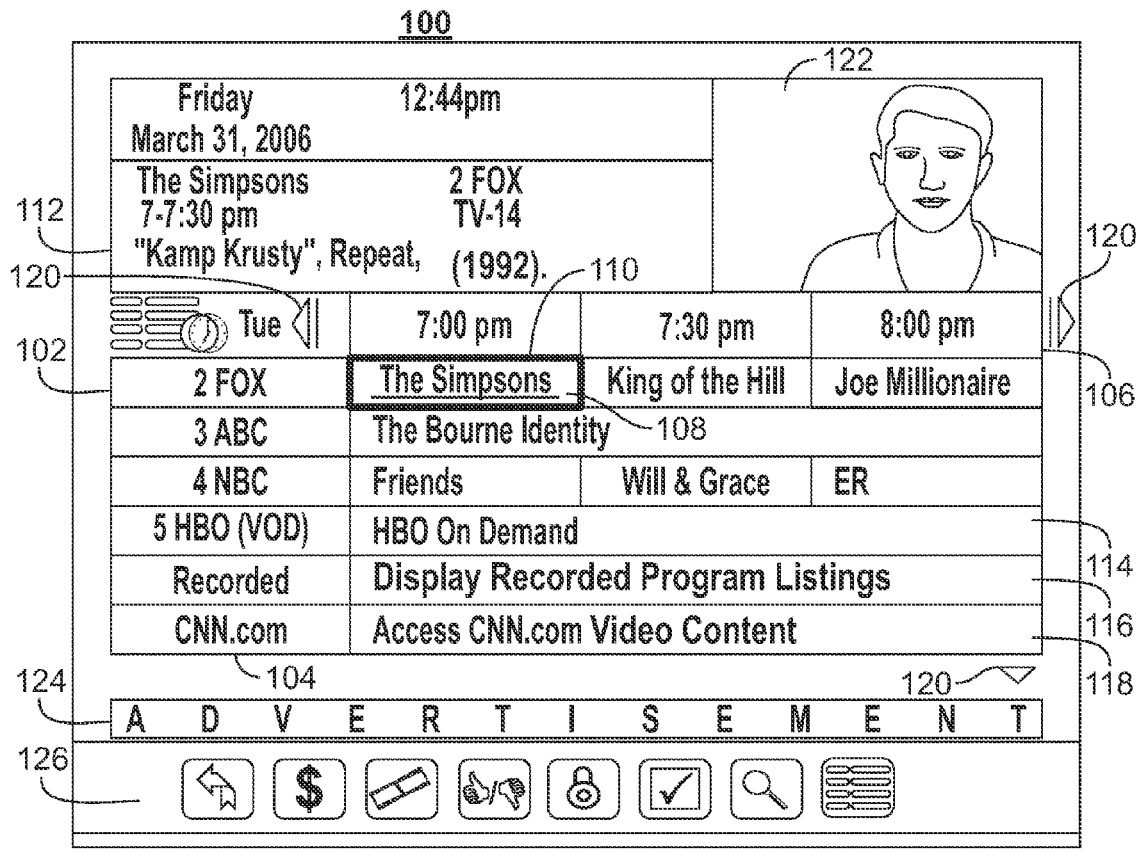
FIG. 1 shows an illustrative embodiment of a display screen that may be used to provide media guidance application listings and other media guidance information in accordance with some embodiments of the disclosure.

Methods and systems are provided herein for presenting advertisements based on social media activity. For example, in an effort to better monetize media such as a live sporting event, a media content provider may monitor social media activity and base the timing or placement of an advertisement based on the social media activity. As one example, a media content provider may determine that a person who typically watches particular media content is currently watching the particular media content, and is currently engaged in social media activity that is unrelated to the particular media content. The media content provider may determine that there is a lull in the media content and may place an advertisement in an overlay on top of the media content, while the media content is playing, at that time to take advantage of a period where the user will not be distracted from a show that is intently being watched.

In some embodiments, control circuitry identifies that a first user is viewing a media asset. For example, the control circuitry may identify that the first user is viewing a football game. The control circuitry may retrieve a user profile for the first user and determine whether the media asset matches characteristics of the user profile. As an example, the control circuitry may determine whether the user profile reflects that the first user typically watches football games. The control circuitry may detect that the first user has transmitted a communication to a remote server, which in turn transmits the communication to a plurality of other users associated with the first user on the remote server. For example, the communication may be a live blog post, a string of characters, a photograph, a video, any combination thereof, or any like transmission. The control circuitry may then determine whether the content of the communication is related to the media asset. For example, the control circuitry may determine that the communication is related to a football game if the communication identifies a football team (e.g., via a hashtag), if the communication includes keywords or photographs indicative of a football-related item (e.g., player names or statistics, a score, etc.), and the like. In response to determining that the content of the communication is not related to the media asset and that the media asset matches characteristics of the user profile, the control circuitry may cause an advertisement to be presented to the user. For example, the control circuitry may determine that the user is sending communications out that discuss a friend's birthday party, which may indicate that a lull has occurred in the football game and the user is bored. The control circuitry may responsively present an advertisement, e.g., as an overlay on top of at least a portion of a video feed of the football game, as the user is unlikely to find the advertisement intrusive since the user is not interested in the football game at the time.

Methods and systems are also provided herein for presenting an advertisement to a user who perceives a media asset to be in a lull, and refraining from presenting the advertisement to a different user who does not perceive the media asset to be in a lull. In some embodiments, control circuitry retrieves a first profile associated with a first user who is consuming a media asset. The control circuitry may determine that the first user perceives a segment of the media asset as a lull based on the first user profile. For example, the media asset may be a football game where the New York Giants and the New England Patriots face one another. The control circuitry may determine that the first user is a fan of the New England Patriots based on the user profile. The control circuitry may further determine that the New England Patriots are losing the game by an insurmountable amount of points, and therefore the first user likely perceives the present segment of the football game as a lull because the team that the first user is rooting for will almost certainly lose.

In some embodiments, the control circuitry may determine that the first user perceives a segment of the media asset as a lull, and responsively identify a second user who is also consuming the media asset. The control circuitry may retrieve a second user profile that is associated with the second user, and may determine whether or not the second user also perceives the segment of the media asset to be a lull based on the second user profile. Following from the example above, for example, if the second user is a fan of the New York Giants, and the Giants are winning a football game that is being played by a significant margin, the second user may be determined not to perceive the present segment of the media asset to be a lull because the second user is likely excited and invested in the football game. In response to determining that the second user does not also perceive the segment of the media asset to be a lull, the control circuitry may cause the advertisement to be presented to the first user but not to the second user.

Methods and systems are also provided herein for establishing a mode of communication between a first user and a second user when a media asset is in a lull. In some embodiments, control circuitry may retrieve a first user profile associated with a first user who is consuming a media asset. The control circuitry may determine that the first user perceives a segment of the media asset as a lull based on the first user profile. For example, the media asset may be a football game where the New York Giants and the New England Patriots face one another. The control circuitry may determine that the first user is a fan of the New England Patriots based on the user profile. The control circuitry may further determine that the New England Patriots are losing the game by an insurmountable amount of points, and therefore the first user likely perceives the present segment of the football game as a lull because the team that the first user is rooting for will almost certainly lose.

In some embodiments, the control circuitry may retrieve a second user profile associated with a second user, and may determine that the second user also perceives the segment of the media asset to be a lull based on the second user profile. For example, the second user may also be a fan of the New England Patriots, which will result in the control circuitry determining that the second user has also lost interested in the football game. The control circuitry may responsively establish a mode of communication (e.g., a chat window) between the first user and the second user.

The term "communication" wherever used in this disclosure refers to a communication from a user that is intended to be viewed by one or more other users. For example, the communication may be a social network message (e.g., a post to a social networking profile intended to be seen by other users) that is sent to a social network server, where the social network server may cause the social network message to be seen by other users. This communication may be made of a textual string of characters, a picture, a video, an icon, an audio communication, any other item that is transmitted by a user and viewable or consumable by another user, or any combination of thereof.

The term "identity of the media asset" wherever used in this disclosure refers to any string of characters, image, video, or any other media that identifies a media asset in a manner that, if a user were to view or hear the characters, image, video, or other media, the user would identify the media asset.

The term "feature of the media asset" wherever used in this disclosure refers to an aspect of a media asset that is typically associated with the media asset. For example, features of a football game include a football, a touchdown, a field goal, a 50-yard line, and the like.

The term "a happenstance of the media asset" wherever used in this disclosure refers to an event or a happening in a media asset. For example, if a touchdown is scored in a football game, the touchdown is a happenstance of the football game.

The term "lull" wherever used in this disclosure refers to a portion or segment of a media asset that involves less activity or is less exciting or engaging to at least one consumer of the media asset, as compared to another portion or segment of the media asset. As an example, a lull may be determined from an emotional indication of the user that is indicative of a user being less interested in a segment of a media asset as compared to another media asset. An emotional indication may be, e.g., determined via a biometric device that outputs a heartbeat pattern that is determined to indicate a lesser interest in a segment of a media asset as compared to a heartbeat pattern detected during a different segment of the media asset (e.g., a lull may be determined when a user's heartbeat has lowered).

As used herein, a "social network," refers to a platform that facilitates networking and/or social relations among people who, for example, share interests, activities, backgrounds, and/or real-life connections. In some cases, social networks may facilitate communication between multiple user devices (e.g., computers, televisions, smartphones, tablets, etc.) associated with different users by exchanging content from one device to another via a social media server. As used herein, a "social media server" refers to a computer server that facilitates a social network. For example, a social media server owned/operated/used by social media provider may make content (e.g., status updates, microblog posts, images, graphic messages, etc.) associated with a first user accessible to a second user that is within the same social network as the first user.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
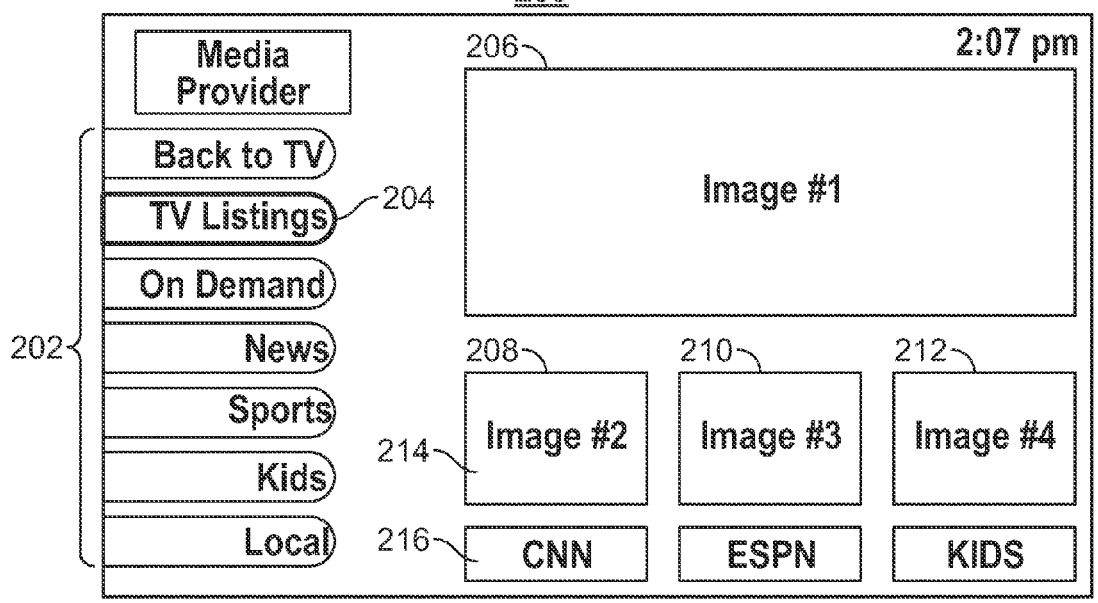
FIG. 2 shows another illustrative embodiment of a display screen that may be used to provide media guidance application listings in accordance with some embodiments of the disclosure.
Figure 5:
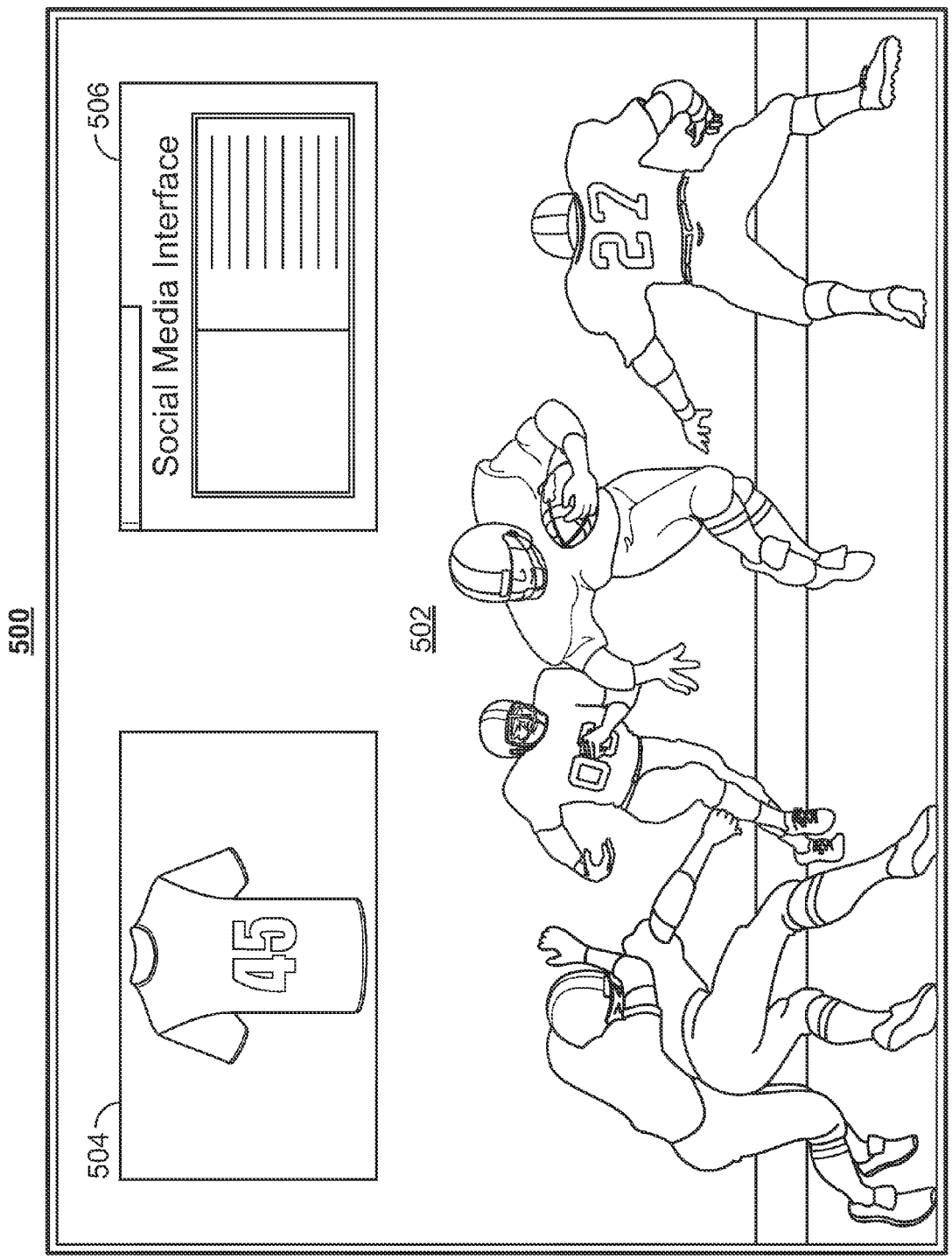
FIG. 5 shows an illustrative embodiment of a display screen including a media asset, an optional advertisement, and an optional social media application, in accordance with some embodiments of the disclosure.

FIGS. 1-2 show illustrative display screens that may be used to provide media guidance data. The display screens shown in FIGS. 1-2 and 5 may be implemented on any suitable user equipment device or platform. While the displays of FIGS. 1-2 and 5 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other pre-defined, user-defined, or other organization criteria.

FIG. 1 shows illustrative grid program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Dec. 29, 2005, which is hereby incorporated by reference herein in its entirety.

Figure 3:
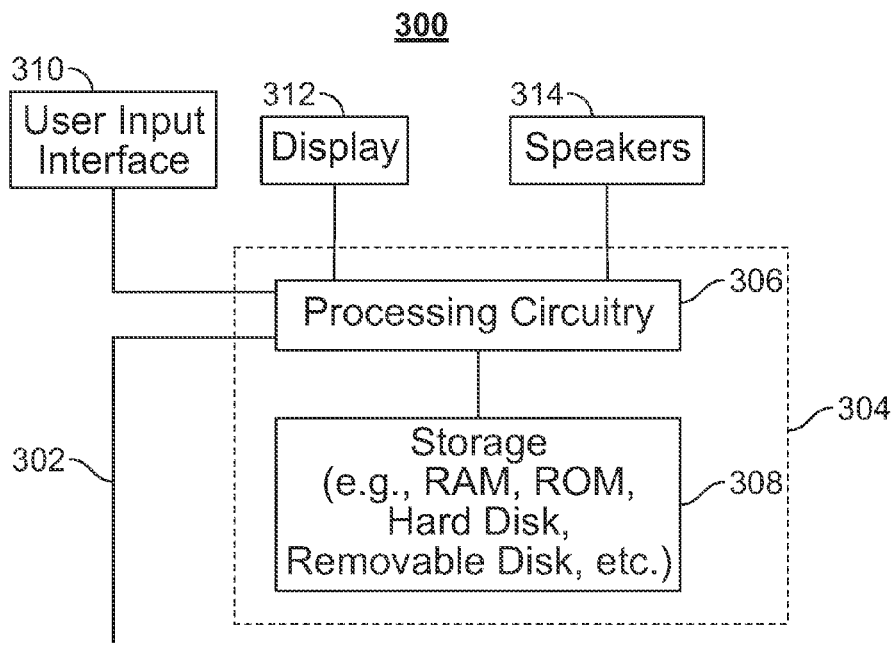
FIG. 3 is a block diagram of an illustrative user equipment (UE) device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 312 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
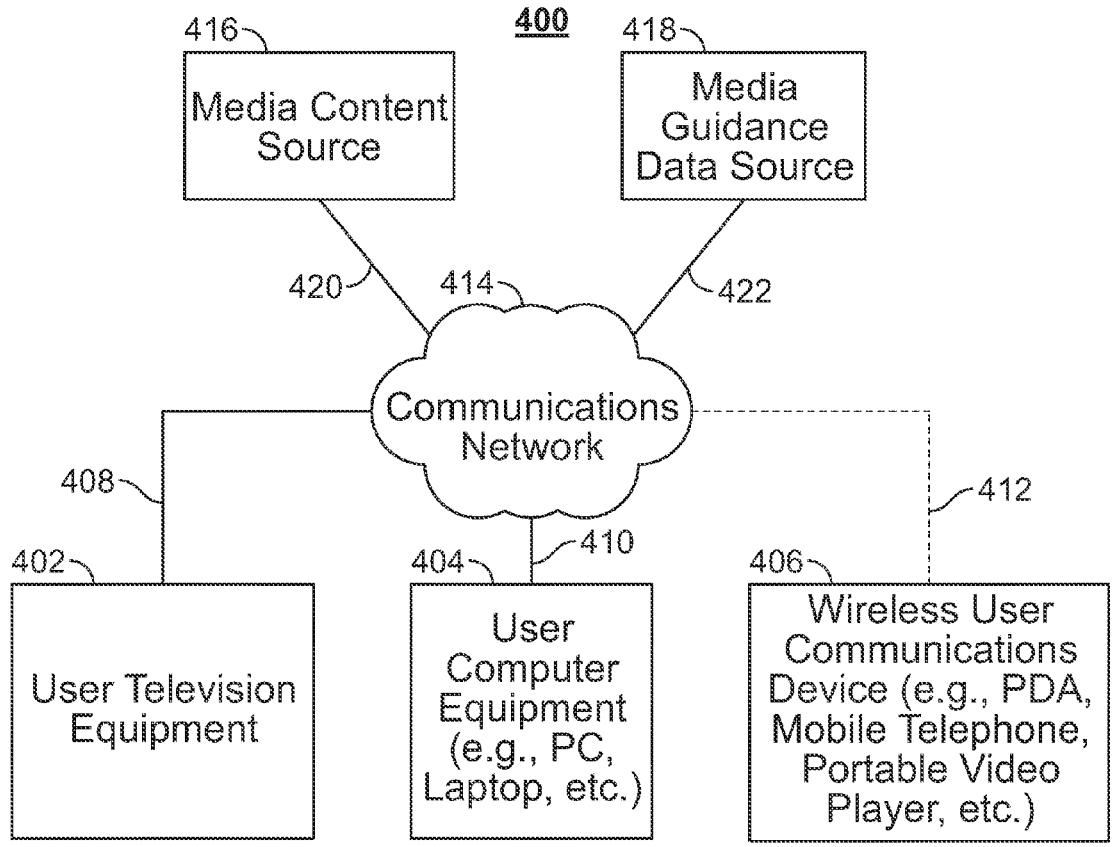
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. patent application Ser. No. 11/179,410, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, control circuitry (e.g., control circuitry 304) may identify that a user who typically watches a particular media asset (e.g., football games) is presently watching the particular media asset. The control circuitry may determine that the user has transmitted a communication that is unrelated to the particular media asset. For example, the control circuitry may determine that a user is sending a message to wish another user a happy birthday while a football game is playing. The control circuitry may determine that the communication (e.g., happy birthday message) is not related to the media asset (e.g., football) that the viewer typically watches, and may responsively cause an advertisement to be presented to the user. As an example, the advertisement may be presented to the user because it is inferred that a lull has occurred in the media asset (e.g., a timeout in a football game) based on the user transmitting a communication that is not related to the football game.

FIG. 5 shows an illustrative embodiment of a display screen including a media asset, an optional advertisement, and an optional social media application, in accordance with some embodiments of the disclosure. Following from FIG. 5, a media asset 502 may be playing on user equipment 500. While user equipment 500 depicts a display of media asset 502 as a video (specifically, a football game), media asset 502 may be any other media asset, such as a still image, an audio recording or live stream, or any other media asset. As will be described above and below, user equipment 502 may optionally display an embedded advertisement 504 and a social media interface 506.

An exemplary embodiment of media asset 502 is a live sporting event. Hereafter, "media asset," "live sporting event," and "football game" are used interchangeably and have the same force and effect. During a football game, there are various points of major activity and excitement. For example, a scoring play or the beginning of an overtime period in a football game may cause excitement and attentiveness in viewers. It may be possible to determine whether a media asset is in a period of excitement or major activity based on social media activity. For example, social media communications may occur in high volume by many people in a short period of time that identify a particular media asset. Control circuitry 304 may determine that the media asset is in a period of excitement based on such social media activity. Determining whether a media asset is in a period of excitement based on social media activity is described further in commonly owned and assigned U.S. patent application Ser. No. 13/622,887, filed Sep. 19, 2012, currently pending, which is hereby incorporated by reference herein in its entirety.

In contrast to periods of excitement, media assets may go into periods of inactivity or reduced activity, thereby causing the inattentiveness of viewers. For example, in a football game, a play may be under review, or a timeout may be called. During these periods of time, viewers may be inattentive and may be distracted by other media. Control circuitry (e.g., control circuitry 304) may be able to determine that a media asset has gone into a period of inactivity based on communications of a user who typically watches media assets like the media asset presently being viewed.

Following from FIG. 5, control circuitry 304 may determine that a user is viewing media asset 502 (e.g., a football game) and may identify the user. Media asset 502 may be viewed for example via display 312. Media asset 502 may be provided from a media content source (e.g., media content source 416) and may be navigated to by utilizing data from a media guidance application, which may be at least partially provided via media guidance data source 418. Media asset 502 may be accessed by a user interacting with user equipment, such as user television equipment 402, user computer equipment 404, or wireless user communications device 406. Media asset 502 may be provided via a communications network (e.g., communications network 414) from the source (e.g., media content source 416).

Control circuitry 304 may retrieve a user profile for the user viewing media asset 502. The user profile may be retrieved from a database (e.g., media guidance data source 416) via a communications network (e.g., communications network 414). The user profile may reflect tendencies or preferences of the user. For example, the retrieved user profile may be determined by control circuitry 304 to show that the user has a history of viewing football games, or games of a particular team, and/or that the user tends to view football games for a long period of time.

Control circuitry 304 may subsequently determine whether the media asset matches characteristics of the user profile. For example, control circuitry 304 may determine characteristics of media asset 502, e.g., by accessing stored characteristics at media guidance data source 418 via communications network 414. As an example, if media asset 502 is a football game of the New York Giants versus the Washington Redskins, control circuitry 304 may determine the team names, the current win/loss records of the two teams, the current score, the current players on each team's roster, and the like. Control circuitry 304 may determine media asset 502 to match characteristics of the user profile if, e.g., the user profile reflects that the user typically watches football games, or that the user typically watches New York Giants games, or that the user typically watches games where Eli Manning is the starting quarterback.

Social media interface 506 is depicted as an application or overlay over media asset 502 on user equipment 500. The functionality of social media interface 506, however, may occur on any device. For example, social media interface 506 may be utilized on a second screen device, such as user equipment 404, or wireless user communications device 406. Examples of other devices that may include the functionality of social media interface 506 include cellular telephones, personal computers, smart watches, laptops, tablet computers, video game consoles, and the like.

Control circuitry 304 may also detect that the user has transmitted a communication via social media interface 506 to a remote server, where the remote server transmits the communication to a plurality of other users associated with the first user on the remote server. For example, control circuitry 304 may detect that the user has typed a string of characters (e.g., using user input interface 310) and disseminated the characters to an audience by way of social media interface 506. Examples of communications may include a live blog post, a social media message, an SMS message, and the like. The remote server (e.g., media guidance data source 418) may be communicated to via communications network 414. The remote server may transmit the communication to the other users by way of communications network 414 such that the other users may, utilizing their own user equipment devices (e.g., user computer equipment 404) may view the communication (e.g., via display 312). In some embodiments, the other users may have exchanged a message with the user sending the communication that identifies the first user. That message may be a friend request or a buddy request, which, if accepted, associates the user and the other users as friends. Such exchanges are discussed in further detail in co-pending, commonly-owned U.S. patent application Ser. No. 11/986,461, filed on Nov. 21, 2007, which is hereby incorporated by reference herein in its entirety.

Control circuitry 304 may determine whether the content of the communication is related to media asset 502. For example, control circuitry 304 may determine whether a feature or aspect of the communication identifies at least one of the identity of media asset 502, a feature of media asset 502, and a happenstance of media asset 502. The identity of media asset 502 may be determined by control circuitry 304 by, e.g., comparing characters of a text string of the communication or features of an image of the communication to a title or description associated with media asset 502. For example, if the communication says "Let's Go Giants!" and media asset 502 is a football game between the Washington Redskins and the New York Giants, control circuitry 304 may determine that the term "Giants" in the communication identifies the identity of the media asset. Control circuitry 304 may determine that the communication identifies a feature of media asset 502 if, e.g., the communication identifies something typically common to media asset 502. As an example, if the communication is an image including a football, and media asset 502 is a football game between the New York Giants and the Washington Redskins, then control circuitry 304 may determine that the communication includes an item (i.e., the football) that identifies a feature of media asset 502, since media asset 502 in this example is a football game. Control circuitry 304 may determine that the communication identifies a happenstance of media asset 502 if the communication includes, e.g., a string of characters or an image that describes a current happening in media asset 502. For example, if media asset 502 is a football game between the New York Giants and the Washington Redskins, and a touchdown was just scored a touchdown in media asset 502, and the communication is a string of characters that says "Giants #Touchdown!!!!," control circuitry 304 may determine that the communication identifies a happenstance of the game—namely, that a touchdown was scored.

In order to determine whether the communication is related to the media asset, control circuitry 304 may parse the communication into various portions and cross-reference each portion against information of a database (e.g., media guidance data source 418). For example, control circuitry 304 may retrieve metadata associated with media asset 502 from media guidance data source 418 and may cross-reference each parsed portion of the communication against the metadata associated with media asset 502. In some embodiments, if a portion of the communication matches metadata associated with media asset 502, control circuitry 304 may determine that the communication identifies media asset 502. In other embodiments, a threshold amount of the communication may have to match the metadata associated with media asset 502 for control circuitry 304 to determine that the communication identifies media asset 502.

Control circuitry 304 may determine that the communication entered via social media interface 506 is not related to media asset 502. As an example, control circuitry 304 may determine that the communication does not identify the identity of the media asset, a feature of the media asset, or a happenstance of the media asset. In response to determining that the content of the communication is not related to media asset 502, and that the media asset matches characteristics of the user profile, control circuitry 304 may cause an advertisement 504 to be presented to the user. Advertisement 504 may be retrieved from a remote or local database (e.g., storage 308 or media content source 416) via communications network 414. Advertisement 504 may have content that is related to the content of media asset 502. For example, if media asset 502 is a football game, advertisement 504 may advertise a store that sells football-related merchandise such as replica player jerseys. In order to present advertisement 504 with such contextually related data, control circuitry 304 may retrieve metadata of media asset 502 from a database (e.g., media content source 416) and may identify a product or service based on the retrieved metadata. Advertisement 504 may then include or advertise the identified product or service.

When determining whether to cause advertisement 504 to be presented to a user, control circuitry 304 may consider the amount of communications that have been transmitted by the user. In some embodiments, control circuitry 304 may determine whether a threshold number of communications have been transmitted by the user. In some embodiments, control circuitry 304 may determine whether a threshold number of communications that identify media asset 502 have been transmitted by the user, and may refrain from presenting advertisement 504 unless the threshold number of communications have been transmitted. In other embodiments, control circuitry 304 may determine whether a threshold number of communications that do not identify media asset 502 have been transmitted by the user, and may refrain from presenting advertisement 504 unless the threshold number of communications have been transmitted. Control circuitry 304 may also determine whether thresholds for both communications that identify media asset 502 and communications that do not identify media asset 502 have been met before causing advertisement 504 to be presented.

Advertisement 504 may be overlaid on top of media asset 502 by control circuitry 304. As described above and below, advertisement 504 may occur when a user who typically views media asset 502 or similar media assets transmits a communication unrelated to media asset 502. The reason for this may be that control circuitry 304 determines that the user is disinterested in the present activity of media asset 502, and so the user would not be disturbed by the appearance of an advertisement. Alternatively, control circuitry 304 may determine that there is a lull in the action of media asset 502 and thus it may be an opportune time to present advertisement 504. As an example, if media asset 502 is a football game, if a timeout is called a user's viewing experience will not be interrupted if advertisement 504 is presented, perhaps in an overlay on top of media asset 502, because gameplay will not occur during a timeout. As another example, if media asset 502 is a sporting event, control circuitry 304 may determine that a user has an interest in one team that is losing by a certain amount of points, and is therefore likely to be disinterested in the game; control circuitry may determine therefrom that the present segment of media asset 502 is a lull from the perspective of the first user.

In some embodiments, control circuitry 304 may cause advertisement 504 to be transparent or semi-transparent. A transparent or semi-transparent presentation of advertisement 504 may allow a user to view media asset 502 simultaneously with advertisement 504 by allowing the user to see through advertisement 504 to view gameplay behind advertisement 504.

In some embodiments, control circuitry 304 may identify a second user that is viewing media asset 502 at the same time that the above-described user is viewing media asset 502. Control circuitry 304 may cause advertisement 504 to be presented to the second user for the same reason that control circuitry 304 causes advertisement 504 to be presented to the first user—namely, in response to the first user transmitting a communication that is not related to the media asset 502, where media asset 502 matches characteristics of the first user's profile. Control circuitry 304 may cause advertisement 504 to be presented at this time because if the first user is likely to be disengaged from media asset 502 at a particular time, it is likely a second user is as well. As an example, if the first user is an avid football fan and is sending unrelated communications to friends, control circuitry 304 may determine that any user would be disengaged at that time—likely because a lull in activity is occurring. Accordingly, control circuitry 304 may cause advertisement 504 to be presented to some or all other users.

Control circuitry 304 may determine whether the user has been viewing media asset 502 for a threshold amount of time before determining whether to cause advertisement 504 to be presented. For example, control circuitry 304 may determine whether a user has been viewing media asset 502 for at least five minutes, in order to ensure the user is not quickly changing between different media assets, or channel surfing. Control circuitry 304 may cause advertisement 504 to be presented to the user when the content of a user communication is not related to media asset 502, the media asset matches characteristics of the user profile, and the user has been viewing the media asset for the threshold amount of time.

In some embodiments, when advertisement 504 is displayed, control circuitry 304 may provide a user with an option to skip the presently displayed advertisement. The option may be indicated within advertisement 504 or may be indicated elsewhere on a display 312 of user equipment 500. Alternatively, a skip option may be located on a second device, such as a second user equipment, a remote control, or any other device that may enable a user to skip advertisement 504. Control circuitry 304 may access a queue of advertisements at a content source (e.g., media content source 416), or may locally queue a plurality of advertisements (e.g., at storage 308). Some or all of the advertisements of the queue of advertisements may be contextually related to media asset 502. When a user selects an option to skip an advertisement, control circuitry 304 may cause a next advertisement of the queue to be generated for display on display 312, or to be played back on speakers 314. Control circuitry 304 may generate for display on display 312 a menu of advertisements that are queued such that a user may select a preferred advertisement to be displayed from the menu of advertisements.

In some embodiments, control circuitry 304 may select advertisement 504 based on both a user profile and the context of the media asset. For example, if media asset 502 is a football game, and control circuitry 304 determines that the user happens to frequent the website of a sporting good store based on the user profile, control circuitry 304 may select an advertisement for a football jersey that is sold by the sporting good store. As another example, control circuitry 304 may produce an link to recent activity by a user as advertisement 504 (e.g., a link to recent purchase activity, or a link to a website a user recently visited), where, when the link is selected, the user is directed to the linked destination.

In some embodiments, advertisement 504 may be recordable or storable for later retrieval. For example, control circuitry 304 may generate for display a selectable option to record or store advertisement 504. As another example, control circuitry 304 may cause advertisement 504 to be interactive, such that, when advertisement 504 is selected, control circuitry 304 responsively records or stores advertisement 504 for later retrieval (e.g., at storage 306).

In some embodiments, control circuitry 304 may cause advertisement 504 to be presented to a user on a second screen device (e.g., user equipment 406) that is different than the user equipment device that media asset 502 is generated for display on (e.g., user equipment device 404). In some embodiments, advertisement 504 may be streamed to the second screen device by control circuitry 304 in real time. In other embodiments, control circuitry 304 may store or record advertisement 504 (e.g., in storage 308), and then later cause advertisement 504 to be transmitted to the second screen device for play back.

In some embodiments, control circuitry 304 may determine that both the first user and the second user perceive the media asset to be a lull. For example, control circuitry 304 may determine that both the first user and the second user are fans of the New England Patriots based on the user profiles of the first user and the second user (e.g., as retrieved from media guidance data source 418). Control circuitry 304 may also determine that both the first user and the second user are consuming media asset 502, which control circuitry 304 may determine to be a football game between the New York Giants and the New England Patriots (e.g., by consulting media guidance data source 418).

Control circuitry 304 may also learn by consulting a database (e.g., media guidance data source 418) that the New York Giants are winning the game by an insurmountable score. For example, control circuitry 304 may identify a threshold score differential, where, when the threshold score differential is exceeded, control circuitry 304 determines that a score differential is insurmountable. In some embodiments, control circuitry 304 may determine the threshold score differential based on user profile information (e.g., a length of time for which a user tends to view a New England Patriots game after a particular score differential has occurred). In some embodiments, the threshold score differential may be predetermined, and control circuitry 304 may retrieve the predetermined threshold score differential (e.g., from storage 308 or media guidance data source 418) for comparison against a present score differential. Control circuitry 304 may determine that the first user and the second user both perceive the segment of media asset 502 (e.g., the football game) to be a lull because the team both the first user and the second user are rooting for (e.g., the New England Patriots) are losing by a score differential that exceeds the threshold score differential.

Control circuitry 304 may, in response to determining that the first user and the second user both perceive the segment of media asset 502 to be a lull, establish a mode of communication (e.g., social media interface 506) between the first user and the second user. The mode of communication may be a chat window that is made accessible by control circuitry 304 to, and viewable by, both the first user and the second user. Control circuitry 304 may cause the chat window to be generated for display as an overlay on top of media asset 502. Alternatively, or additionally, control circuitry 304 may cause the chat window to be generated for display on a user equipment device that is different than the user equipment device that media asset 502 is being consumed on. As an example, media asset 502 may be consumed on user television equipment 402, and control circuitry 304 may cause the chat window to be generated for display on user computer equipment 404. In some embodiments, control circuitry 304 may, when it is determined that a segment of media asset 502 is a lull, cause a selectable option to be transmitted to the first user and/or the second user for joining a communication session. Control circuitry 304 may, when control circuitry 304 receives a selection of the selectable option (e.g., via user input interface 310), cause a communications interface (e.g., social media interface 506) to be enabled at a user equipment device (e.g., user television equipment 402) of the first user or the second user.

In some embodiments, control circuitry 304 may generate for display (e.g., on display 312) one or more selectable options. As an example, control circuitry 304 may generate for display a selectable option for establishing the mode of communication (e.g., social media interface 506, which may be a chat window) on top of the media asset (e.g., media asset 502). When control circuitry 304 receives a user selection of this selectable option (e.g., via user input interface 310), control circuitry 304 may cause social media interface 506 (e.g., a chat window) to be generated for display on top of media asset 502.

As another example, control circuitry 304 may generate for display (e.g., on display 312) a selectable option for establishing the mode of communication (e.g., social media interface 506) on a specified user equipment device (e.g., wireless user communications device 406). For example, control circuitry 304 may generate for display a selectable option (e.g., on top of media asset 502), where, when the selectable option is selected, control circuitry 304 causes a chat window to open on a user's smartphone (e.g., wireless user communications device 406).

Control circuitry 304 may also generate for display (e.g., on display 312) a selectable option for tearing down an established mode of communication. For example, if a user is on a chat window (e.g., via social media interface 506) and wishes to exit the chat window, control circuitry 304 may receive a selection of a selectable option to exit the chat window and tear down any associated channel or mode.

Control circuitry 304 may generate for display (e.g., on display 312) a selectable option to toggle a view of the mode of communication (e.g., social media interface 506). For example, each time control circuitry 304 detects a user input (e.g., via user input 310) that selects the selectable option to toggle the view of the mode of communication, control circuitry may generate for display social media interface 506 if it is not presently displayed, and may remove a display of social media interface 506 if it is presently displayed.

Figure 6:
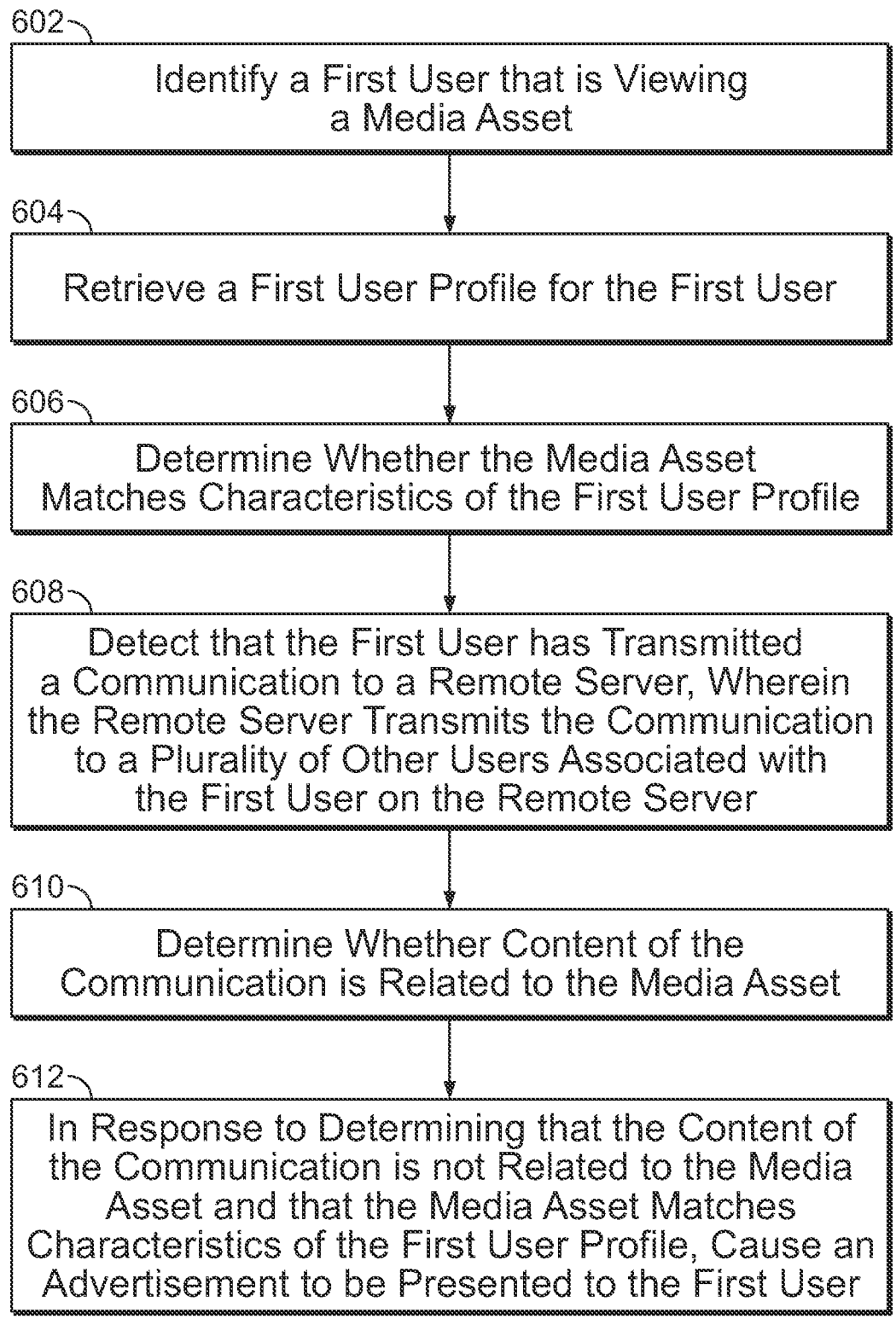
FIG. 6 is a flowchart of illustrative steps involved in determining whether to present an advertisement to a user.

FIG. 6 is a flowchart of illustrative steps involved in determining whether to present an advertisement to a user. It should be noted that process 600 or any step thereof could be performed on, or provided by, any of the devices shown in FIGS. 3-4. For example, process 600 may be executed by control circuitry 304 (FIG. 3) as instructed by a media guidance application implemented on a user device (e.g., user equipment devices 402, 404, and/or 406 (FIG. 4)) in order to determine whether to retain media assets (e.g., as discussed in relation to FIG. 102). In addition, one or more steps of process 600 may be incorporated into or combined with one or more steps of any other process or embodiment.

In some embodiments, a media asset provider may wish to dynamically overlay an advertisement over a media asset based on social media activity of a user. For example, if the user's profile reflects that the user typically views the media asset or similar media assets, and the user is presently transmitting communications that are not related to the media asset, a media asset provider may configure control circuitry 304 to deem it an opportune time to cause an advertisement to be presented to a user.

FIG. 6 is a flowchart of illustrative steps involved in determining whether to present an advertisement to a user. In step 602, control circuitry (e.g., control circuitry 304) may identify that a first user is viewing a media asset (e.g., media asset 502). Media asset 502 may be viewed by the first user via display 312. Media asset 502 may be accessed by the first user or provided to the first user from a remote content source (e.g., media content source 416) via a communications network (e.g., communications network 414).

In step 604, the control circuitry (e.g., control circuitry 304) may retrieve a user profile for the first user. The user profile may be retrieved from a local storage (e.g., storage 308) or a remote database (e.g., media guidance data source 418) accessible via a communications network (e.g., communications network 414).

In step 606, control circuitry (e.g., control circuitry 304) may determine whether the media asset (e.g., media asset 502) matches characteristics of the user profile. For example, control circuitry 304 may determine characteristics of media asset 502, which may be a football game, and for which characteristics may be particular football team names, standings of a team relative to other teams, and the like. Control circuitry 304 may compare these characteristics of media asset 502 with characteristics of the user profile, and determine whether there are characteristics in common between media asset 502 and the user profile. In the event that there are commonalities, control circuitry 304 may determine that media asset 502 matches characteristics of the user profile.

In step 608, control circuitry 304 may detect that the first user has transmitted a communication to a remote server. For example, the first user may utilize user input interface 310 to input a string of characters to be sent as a communication, and control circuitry 304 may receive the communication and cause the communication to be transmitted via communications network 414 to a remote server, such as media guidance data source 418. The remote server may transmit the communication to a plurality of other users associated with the first user on the remote server. The plurality of other users may receive the communication at respective control circuitry 304 of their respective user equipment devices (e.g., user computer equipment 404). The other users may have exchanged a message with the first user that identifies the first user (e.g., a friend request).

In step 610, control circuitry (e.g., control circuitry 304) may determine whether content of the communication is related to the media asset (e.g., media asset 502). As described above and below, control circuitry 304 may determine that content of the communication is related to the media asset if the communication identifies at least one of the identity of the media asset, a feature of the media asset, and a happenstance of the media asset. For example, if media asset 502 is a football game, and the communication includes the word "touchdown," control circuitry 304 may determine that the communication identifies a feature of the media asset since a touchdown is an integral part of a football game.

In step 612, in response to determining that the content of the communication is not related to the media asset (e.g., media asset 502) and that the media asset matches characteristics of the user profile, control circuitry (e.g., control circuitry 304) may cause an advertisement (e.g., advertisement 504) to be presented to the first user. As described above and below, control circuitry 304 may determine that the communication is not related to media asset 502 if the communication does not identify at least one of the identity of the media asset, a feature of the media asset, and a happenstance of the media asset. Advertisement 504 may be presented to the first user by via, e.g., display 312. The content of advertisement 504 may be retrieved from a content source such as media content source 416. As described above and below, the content of advertisement 504 may be related to the same context of media asset 502, or may be related to a different context.

It is contemplated that the steps or descriptions of FIG. 6 may be used with any other embodiment of this disclosure. In addition, the steps and descriptions described in relation to FIG. 6 may be done in alterative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
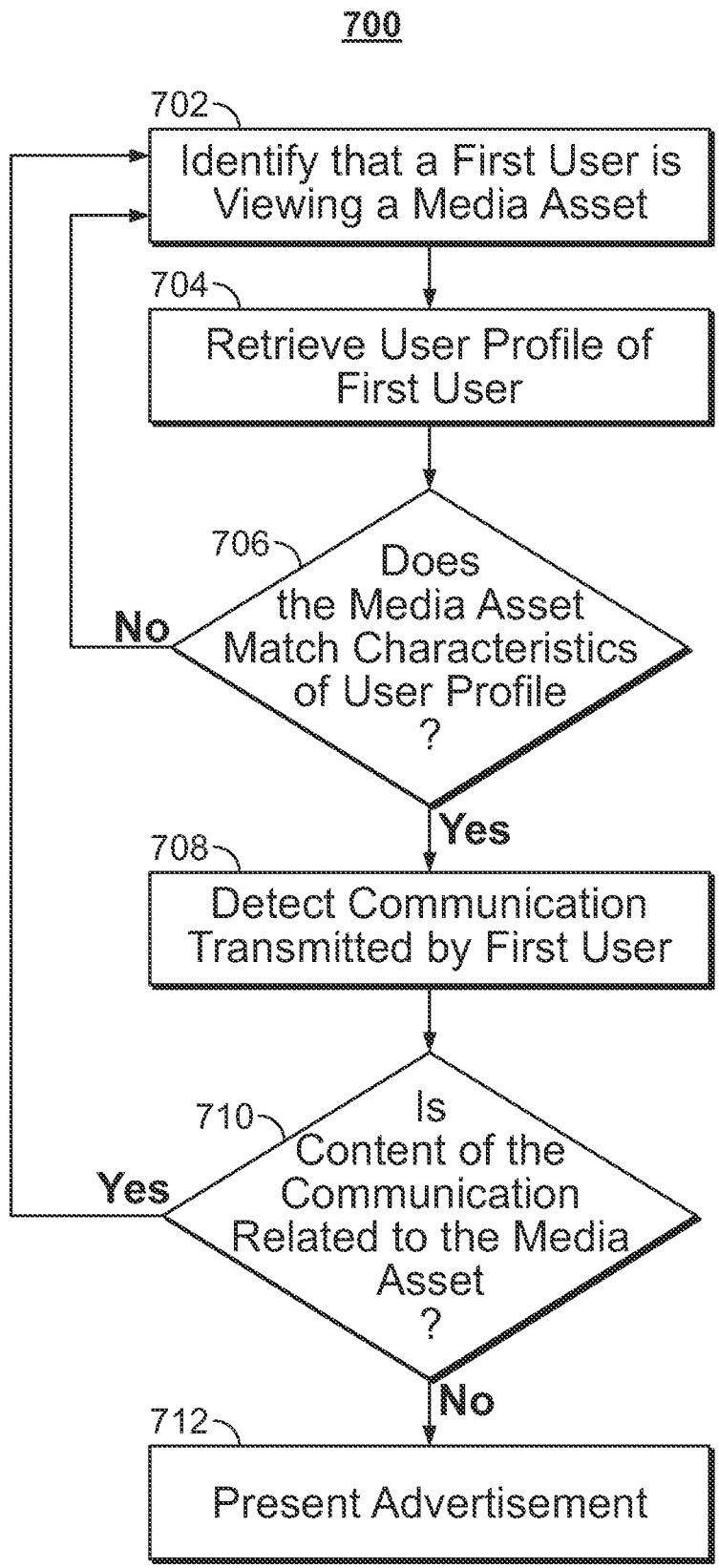
FIG. 7 is a flowchart of illustrative determinative steps involved in determining whether to present an advertisement to a user, in accordance with some embodiments of the disclosure.

FIG. 7 is a flowchart of illustrative determinative steps involved in determining whether to present an advertisement to a user, in accordance with some embodiments of the invention. It should be noted that process 700 or any step thereof could be performed on, or provided by, any of the devices shown in FIGS. 3-4. For example, process 700 may be executed by control circuitry 304 (FIG. 3) as instructed by a media guidance application implemented on a user device (e.g., user equipment devices 402, 404, and/or 406 (FIG. 4)) in order to determine whether to retain media assets (e.g., as discussed in relation to FIG. 102). In addition, one or more steps of process 700 may be incorporated into or combined with one or more steps of any other process or embodiment.

In some embodiments, a media asset provider may wish to dynamically overlay an advertisement over a media asset based on social media activity of a user. For example, if the user's profile reflects that the user typically views the media asset or similar media assets, and the user is presently transmitting communications that are not related to the media asset, a media asset provider may configure control circuitry 304 to deem it an opportune time to cause an advertisement to be presented to a user.

FIG. 7 is a flowchart of illustrative determinative steps involved in determining whether to present an advertisement to a user, in accordance with some embodiments of the invention. In step 702, control circuitry (e.g., control circuitry 304)

may identify that a first user is viewing a media asset (e.g., media asset 502). The first user may be viewing the media asset via display 310 of user equipment 500. The media asset (e.g., media asset 502) may be accessed from media content source 416 via communications network 414 by control circuitry 304 of user equipment device 500.

In step 704, the control circuitry (e.g., control circuitry 304) may retrieve a user profile for the first user. The user profile may be retrieved from a local storage (e.g., storage 308) or a remote database (e.g., media guidance data source 418) accessible via a communications network (e.g., communications network 414).

In step 706, control circuitry (e.g., control circuitry 304) may determine whether the media asset (e.g., media asset 502) matches characteristics of the user profile of the first user. If control circuitry 304 determines that media asset 502 does match characteristics of the user profile for the first user, for example, control circuitry 304 may execute step 708. On the other hand, if control circuitry 304 determines that media asset 502 does not match characteristics of the user profile for the first user, control circuitry 304 may restart process 700. For example, control circuitry 304 may determine characteristics of media asset 502, which may be a football game, and for which characteristics may be particular football team names, standings of a team relative to other teams, and the like. Control circuitry 304 may compare these characteristics of media asset 502 with characteristics of the user profile, and determine whether there are characteristics in common between media asset 502 and the user profile. In the event that there are commonalities, control circuitry 304 may determine that media asset 502 matches characteristics of the user profile and may execute step 708 of process 700, or else control circuitry 304 may restart process 700.

In step 708, control circuitry 304 may detect that the first user has transmitted a communication (e.g., to a remote server). For example, the first user may utilize user input interface 310 to input a string of characters to be sent as a communication, and control circuitry 304 may receive the communication and cause the communication to be transmitted via communications network 414 to a remote server, such as media guidance data source 418. The remote server may transmit the communication to a plurality of other users associated with the first user on the remote server. The plurality of other users may receive the communication at respective control circuitry 304 of their respective user equipment devices (e.g., user computer equipment 404). The other users may have exchanged a message with the first user that identifies the first user (e.g., a friend request).

In step 710, control circuitry (e.g., control circuitry 304) may determine whether the content of the detected communication is related to the media asset (e.g., media asset 502). As described above and below, control circuitry 304 may determine that content of the communication is related to the media asset if the communication identifies at least one of the identity of the media asset, a feature of the media asset, and a happenstance of the media asset. For example, if media asset 502 is a football game, and the communication includes the word "touchdown," control circuitry 304 may determine that the communication identifies a feature of the media asset since a touchdown is an integral part of a football game. In the event that control circuitry 304 determines that the content of the communication is related to the media asset 502, control circuitry 304 may cause process 700 to restart. If control circuitry 304 determines that the content of the communication is not related to the media asset 502, control circuitry 304 may execute step 712. In step 712, control circuitry 304 may cause an advertisement (e.g., advertisement 504) to be presented. As described above and below, control circuitry 304 may determine that the communication is not related to media asset 502 if the communication does not identify at least one of the identity of the media asset, a feature of the media asset, and a happenstance of the media asset. Advertisement 504 may be presented to the first user by via, e.g., display 312. The content of advertisement 504 may be retrieved from a content source such as media content source 416. As described above and below, the content of advertisement 504 may be related to the same context of media asset 502, or may be related to a different context.

It is contemplated that the steps or descriptions of FIG. 7 may be used with any other embodiment of this disclosure. In addition, the steps and descriptions described in relation to FIG. 7 may be done in alterative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

Figure 8:
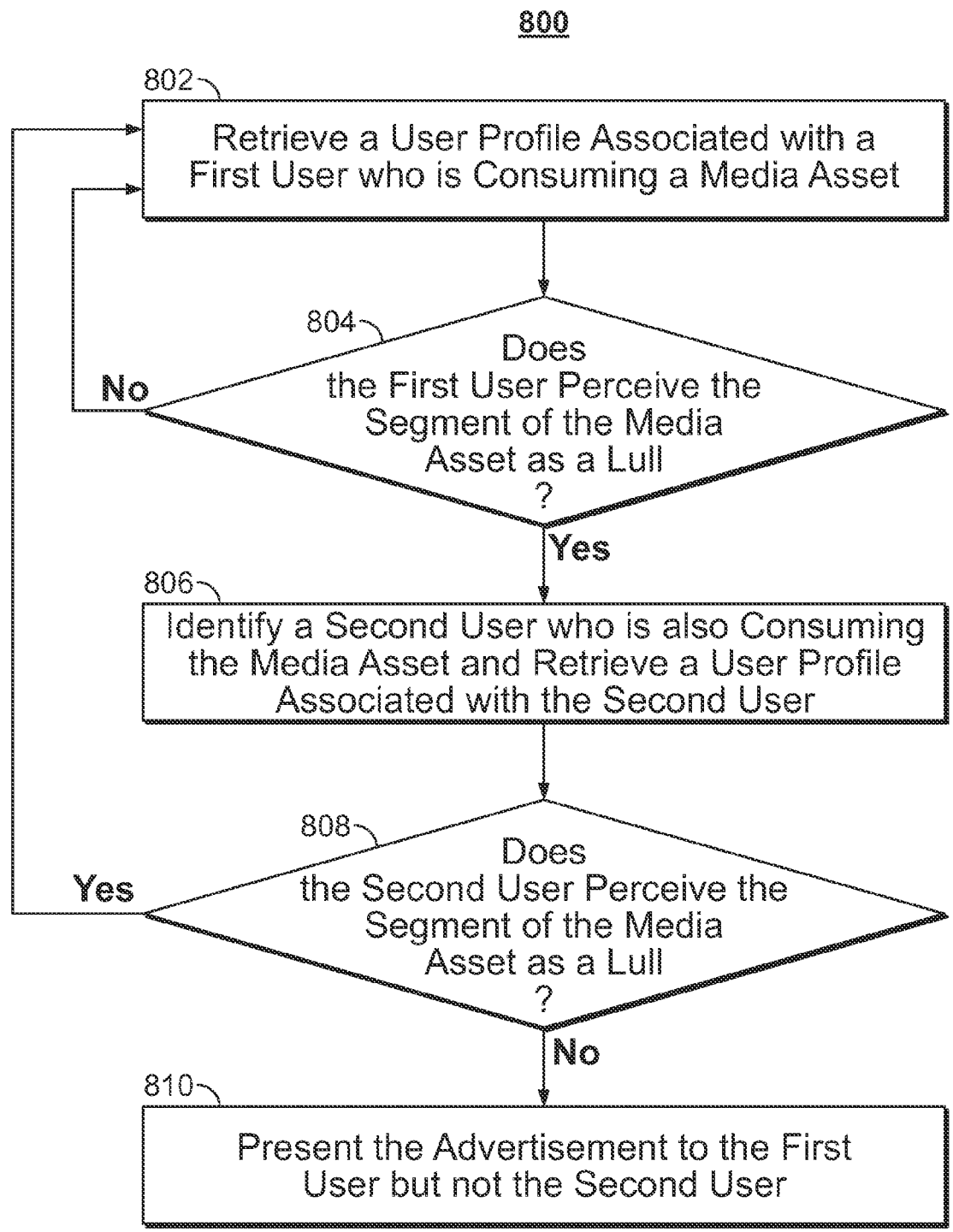
FIG. 8 is a flowchart of illustrative steps involved in determining whether to present an advertisement to one user and not another user based on each user's perception, in accordance with some embodiments of the disclosure.

FIG. 8 is a flowchart of illustrative determinative steps involved in determining whether to present an advertisement to a user, in accordance with some embodiments of the invention. It should be noted that process 800 or any step thereof could be performed on, or provided by, any of the devices shown in FIGS. 3-4. For example, process 800 may be executed by control circuitry 304 (FIG. 3) as instructed by a media guidance application implemented on a user device (e.g., user equipment devices 402, 404, and/or 406 (FIG. 4)) in order to determine whether to retain media assets (e.g., as discussed in relation to FIG. 102). In addition, one or more steps of process 800 may be incorporated into or combined with one or more steps of any other process or embodiment.

In some embodiments, control circuitry may retrieve a first user profile associated with a first user, and determine, based on the first user profile, that the first user perceives a segment of the media asset as a lull. For example, the control circuitry may determine whether the first user is bored based on a happenstance of the media asset and based on the first user's profile. The control circuitry may responsively identify a second user who is consuming the same media asset, retrieve a second user profile associated with the second user, and determine whether or not the second user also perceives the segment of the media asset to be a lull based on the user profile. The control circuitry may, in response to determining that the second user does not also perceive the segment of the media asset to be a lull, cause an advertisement to be presented to the first user but not the second user.

FIG. 8 is a flowchart of illustrative steps involved in determining whether to present an advertisement to one user and not another user based on each user's perception. Process 800 begins at step 802, where control circuitry (e.g., control circuitry 304) retrieves a user profile (e.g., from a data base such as media guidance data source 418 via communications network 414) associated with a first user who is consuming a media asset (e.g., media asset 502). At step 804, control circuitry 304 may determine whether the first user perceives the segment of the media asset as a lull. For example, control circuitry 304 may determine whether the first user sent a communication that does not identify media asset 502, as described in detail above and below, to determine whether the first user perceives the segment of the media asset as a lull. As another example, control circuitry 304 may determine whether a threshold score differential is exceeded in media asset 502, as described above and below, to determine whether the first user perceives the segment of the media asset as a lull. When control circuitry 304 does not determine the first user to perceive the segment of the media asset as a lull, control circuitry 304 may restart process 800 or end the process. When control circuitry 304 does determine the first user to perceive the segment of the media asset as a lull, control circuitry 304 may advance to step 806.

At step 806, control circuitry 304 may identify a second user who is also consuming the media asset (e.g., media asset 502) and retrieve a second user profile associated with the second user (e.g., from media guidance data source 418 via communications network 414). At step 808, control circuitry 304 may determine whether the second user perceives the segment of the media asset as a lull. For example, control circuitry 304 may determine whether the second user sent a communication that does not identify media asset 502, as described in detail above and below, to determine whether the second user perceives the segment of the media asset as a lull. As another example, control circuitry 304 may determine whether a threshold score differential is exceeded in media asset 502, as described above and below, to determine whether the second user perceives the segment of the media asset as a lull. When control circuitry 304 does determine the second user to perceive the segment of the media asset as a lull, control circuitry 304 may end or restart process 800. When control circuitry 304 determines that the second user does not perceive the segment of the media asset as a lull, control circuitry 304 may advance to step 810.

At step 810, control circuitry 304 may cause an advertisement (e.g., advertisement 504) to be presented to the first user but not the second user. For example, because the first user perceives the segment of the media asset to be a lull, the first user is unlikely to be disturbed or interrupted by the display of an advertisement (e.g., advertisement 504). Likewise, because the second user does not perceive the segment of the media asset to be a lull, the second user is likely to be disturbed or interrupted by the display of an advertisement (e.g., advertisement 504), so control circuitry 304 may responsively refrain from presenting advertisement 504 to the second user.

It is contemplated that the steps or descriptions of FIG. 8 may be used with any other embodiment of this disclosure. In addition, the steps and descriptions described in relation to FIG. 8 may be done in alterative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 8.

Figure 9:
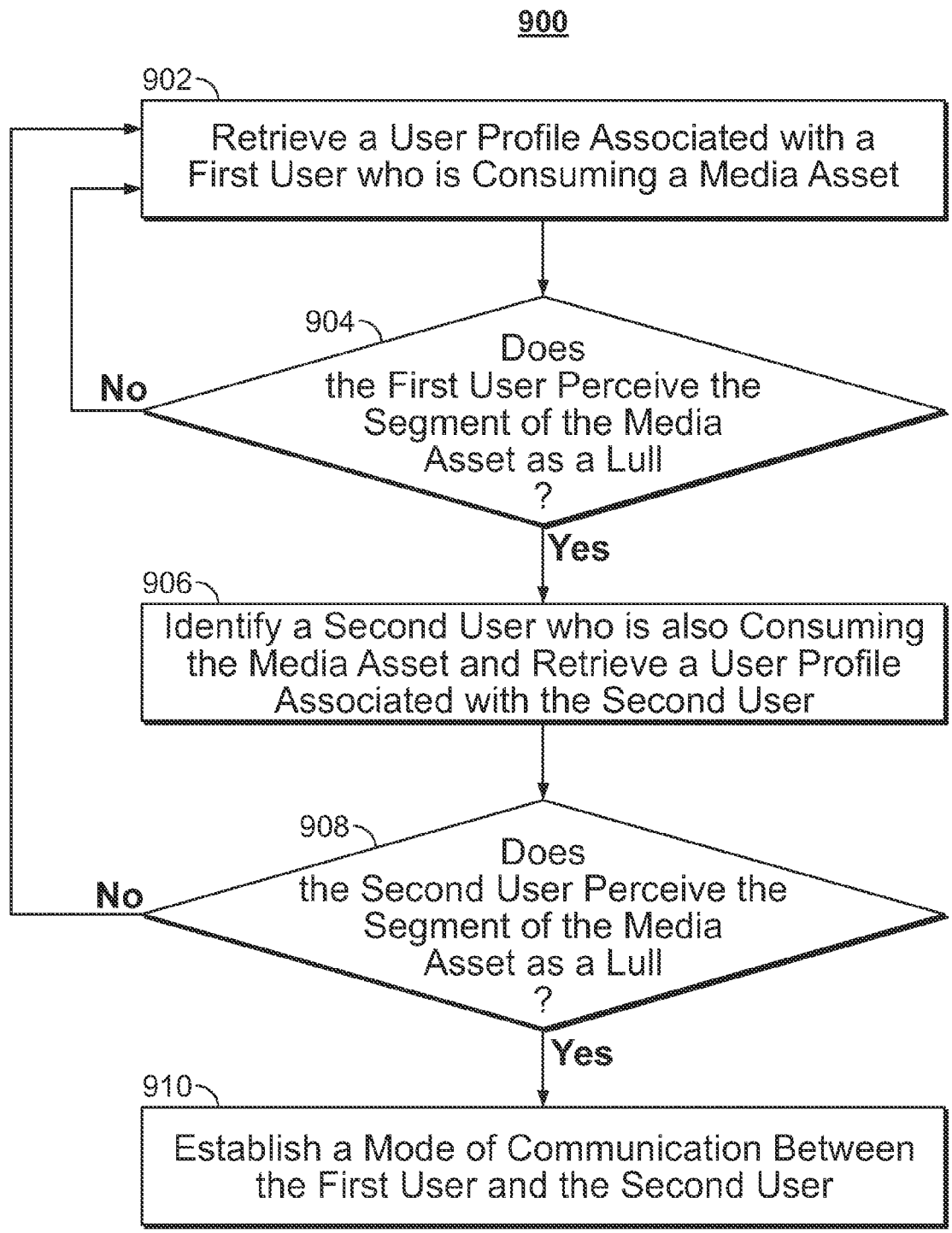
FIG. 9 is a flowchart of illustrative steps involved in determining whether to open a mode of communication between two users, in accordance with some embodiments of the disclosure.

FIG. 9 is a flowchart of illustrative steps involved in determining whether to open a mode of communication between two users, in accordance with some embodiments of the disclosure. It should be noted that process 900 or any step thereof could be performed on, or provided by, any of the devices shown in FIGS. 3-4. For example, process 900 may be executed by control circuitry 304 (FIG. 3) as instructed by a media guidance application implemented on a user device (e.g., user equipment devices 402, 404, and/or 406 (FIG. 4)) in order to determine whether to retain media assets (e.g., as discussed in relation to FIG. 102). In addition, one or more steps of process 900 may be incorporated into or combined with one or more steps of any other process or embodiment.

In some embodiments, control circuitry may retrieve a first user profile associated with a first user, and determine, based on the first user profile, that the first user perceives a segment of the media asset as a lull. For example, the control circuitry may determine whether the first user is bored based on a happenstance of the media asset and based on the first user's profile. The control circuitry may responsively identify a second user who is consuming the same media asset, retrieve a second user profile associated with the second user, and determine whether the second user also perceives the segment of the media asset to be a lull based on the user profile. The control circuitry may, in response to determining that the both the first user and the second user perceive the segment of the media asset to be in a lull, cause a mode of communication to be established between the first user and the second user.

FIG. 9 is a flowchart of illustrative steps involved in determining whether to present an advertisement to one user and not another user based on each user's perception. Process 900 begins at step 902, where control circuitry (e.g., control circuitry 304) retrieves a user profile (e.g., from a data base such as media guidance data source 418 via communications network 414) associated with a first user who is consuming a media asset (e.g., media asset 502). At step 904, control circuitry 304 may determine whether the first user perceives the segment of the media asset as a lull. For example, control circuitry 304 may determine whether the first user sent a communication that does not identify media asset 502, as described in detail above and below, to determine whether the first user perceives the segment of the media asset as a lull. As another example, control circuitry 304 may determine whether a threshold score differential is exceeded in media asset 502, as described above and below, to determine whether the first user perceives the segment of the media asset as a lull. When control circuitry 304 does not determine the first user to perceive the segment of the media asset as a lull, control circuitry 304 may restart process 900 or end the process. When control circuitry 304 does determine the first user to perceive the segment of the media asset as a lull, control circuitry 304 may advance to step 906.

At step 906, control circuitry 304 may identify a second user who is also consuming the media asset (e.g., media asset 502) and retrieve a second user profile associated with the second user (e.g., from media guidance data source 418 via communications network 414). At step 908, control circuitry 304 may determine whether the second user perceives the segment of the media asset as a lull. For example, control circuitry 304 may determine whether the second user sent a communication that does not identify media asset 502, as described in detail above and below, to determine whether the second user perceives the segment of the media asset as a lull. As another example, control circuitry 304 may determine whether a threshold score differential is exceeded in media asset 502, as described above and below, to determine whether the second user perceives the segment of the media asset as a lull.

When control circuitry 304 determine the second user to not perceive the segment of the media asset as a lull, control circuitry 304 may end or restart process 900. When control circuitry 304 determines that the second user does perceive the segment of the media asset as a lull, control circuitry 304 may advance to step 910.

At step 910, control circuitry 304 may cause a mode of communication (e.g., via social media interface 506) to be established between the first user and the second user. For example, because both the first user and the second user perceive the segment of the media asset to be a lull, the first user and the second user are both unlikely to be disturbed or interrupted by the display of an advertisement (e.g., advertisement 504). Accordingly, control circuitry 304 may establish a mode of communication (e.g., a chat window via social media interface 506) between the first user and the second user, such that the first user and the second user may communicate during the lull.

It is contemplated that the steps or descriptions of FIG. 9 may be used with any other embodiment of this disclosure. In addition, the steps and descriptions described in relation to FIG. 9 may be done in alterative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 9.

It will be apparent to those of ordinary skill in the art that methods involved in the present invention may be embodied in a computer program product that includes a computer usable and/or readable medium. For example, such a computer usable medium may consist of a read-only memory device, such as a CD-ROM disk or conventional ROM devices, or a random access memory, such as a hard drive device or a computer diskette, having a computer readable program code stored thereon. It should also be understood, that methods, techniques, and processes involved in the present invention may be executed using processing circuitry. For instance, the determination of whether an advertisement should be generated for display as described herein may be performed by processing circuitry, e.g., by processing circuitry 306 of FIG. 3. The processing circuitry, for instance, may be a general purpose processor, a customized integrated circuit (e.g., an ASIC), or a field-programmable gate array (FPGA) within user equipment 108 or one of servers 122 of FIG. 1. For example, media assets as described herein may be stored in, and retrieved from, storage 308 of FIG. 3, or media guidance data source 418 of FIG. 4. Furthermore, processing circuitry, or a computer program, may update a user profile, the content of a communication of a user, updating the information stored within storage 308 of FIG. 3 or media guidance data source 418 of FIG. 4.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes.

What is claimed is:

1. A method for establishing a mode of communication, the method comprising:
    retrieving, using a video consumption application, a first user profile associated with a first user who is consuming a media asset;
    determining, using the video consumption application, that the first user perceives a segment of the media asset as a lull based on the first user profile;
    retrieving, using the video consumption application, a second user profile associated with the second user;
    determining, using the video consumption application, that the second user also perceives the segment of the media asset to be a lull based on the second user profile; and
    in response to determining that the first user and the second user both perceive the media asset to be a lull, establishing a mode of communication between the first user and the second user by generating for display, using the video consumption application, a user interface through which the first user may communicate with the second user by way of the mode of communication.

2. The method of claim 1, wherein establishing the mode of communication between the first user and the second user comprises generating for display a chat window that is accessible by, and viewable by, both the first user and the second user.

3. The method of claim 2, wherein the chat window is an overlay on top of the media asset.

4. The method of claim 2, wherein the chat window is generated for display on a user equipment device that is different to a device that the media asset is currently being consumed from.

5. The method of claim 1, further comprising generating for display at least one selectable option for: establishing the mode of communication on top of the media asset, establishing the mode of communication on a specified user equipment device, tearing down the mode of communication, and toggling a view of the mode of communication.

6. The method of claim 1, further comprising:
    generating for display a selectable option to the first user to join a communication session;
    receiving a selection of the selectable option from the first user; and
    in response to receiving the selection of the selectable option from the first user, causing a communications interface to be enabled at a user equipment device of the first user.

7. The method of claim 6, further comprising:
    generating for display the selectable option to the second user to join the communication session;
    receiving a selection of the selectable option from the second user; and
    in response to receiving the selection of the selectable option from the second user, causing the communications interface to be enabled at a user equipment device of the second user.

8. The method of claim 1, wherein determining that the first user perceives a segment of the media asset as a lull based on the first user profile further comprises:
    detecting that the first user has transmitted a communication to a remote server;
    determining whether content of the communication is related to the media asset; and
    in response to determining that the content of the communication is not related to the media asset and that the media asset matches characteristics of the first user profile, determining that the first user perceives a segment of the media asset as a lull.

9. The method of claim 8, wherein the content of the communication is not related to the media asset if the communication does not identify at least one of the identity of the media asset, a feature of the media asset, and a happenstance of the media asset.

10. The method of claim 1, further comprising:
    in response to determining that the first user and the second user both perceive the media asset to be a lull, causing an advertisement to be presented to the first user and the second user.

11. A system for establishing a mode of communication, the system comprising:
    communications circuitry; and
    control circuitry configured to:
        retrieve, using a video consumption application, using the communications circuitry, a first user profile associated with a first user who is consuming a media asset;

determine, using the video consumption application, that the first user perceives a segment of the media asset as a lull based on the first user profile;

retrieve, using the video consumption application, a second user profile associated with the second user;

determine, using the video consumption application, that the second user also perceives the segment of the media asset to be a lull based on the second user profile; and in response to determining that the first user and the second user both perceive the media asset to be a lull, establish a mode of communication between the first user and the second user by generating for display, using the video consumption application, a user interface through which the first user may communicate with the second user by way of the mode of communication.

12. The system of claim 11, wherein the control circuitry is further configured, when establishing the mode of communication between the first user and the second user, to generate for display a chat window that is accessible by, and viewable by, both the first user and the second user.

13. The system of claim 12, wherein the chat window is an overlay on top of the media asset.

14. The system of claim 12, wherein the chat window is generated for display on a user equipment device that is different to a device that the media asset is currently being consumed from.

15. The system of claim 12, wherein the control circuitry is further configured to generate for display at least one selectable option for: establishing the mode of communication on top of the media asset, establishing the mode of communication on a specified user equipment device, tearing down the mode of communication, and toggling a view of the mode of communication.

16. The system of claim 11, wherein the control circuitry is further configured to:

generate for display a selectable option to the first user to join a communication session;

receive a selection of the selectable option from the first user; and in response to receiving the selection of the selectable option from the first user, cause a communications interface to be enabled at a user equipment device of the first user.

17. The system of claim 16, wherein the processor is further configured to:

generate for display the selectable option to the second user to join the communication session;

receive a selection of the selectable option from the second user; and in response to receiving the selection of the selectable option from the second user, cause the communications interface to be enabled at a user equipment device of the second user.

18. The system of claim 11, wherein the control circuitry is further configured, when determining that the first user perceives a segment of the media asset as a lull based on the first user profile further, to:

detect that the first user has transmitted a communication to a remote server;

determine whether content of the communication is related to the media asset; and in response to determining that the content of the communication is not related to the media asset and that the media asset matches characteristics of the first user profile, determine that the first user perceives a segment of the media asset as a lull.

19. The system of claim 18, wherein the content of the communication is not related to the media asset if the communication does not identify at least one of the identity of the media asset, a feature of the media asset, and a happenstance of the media asset.

20. The system of claim 11, wherein the control circuitry is further configured to: in response to determining that the first user and the second user both perceive the media asset to be a lull, cause an advertisement to be presented to the first user and the second user.

* * * * *